UNITED STATES PATENT OFFICE

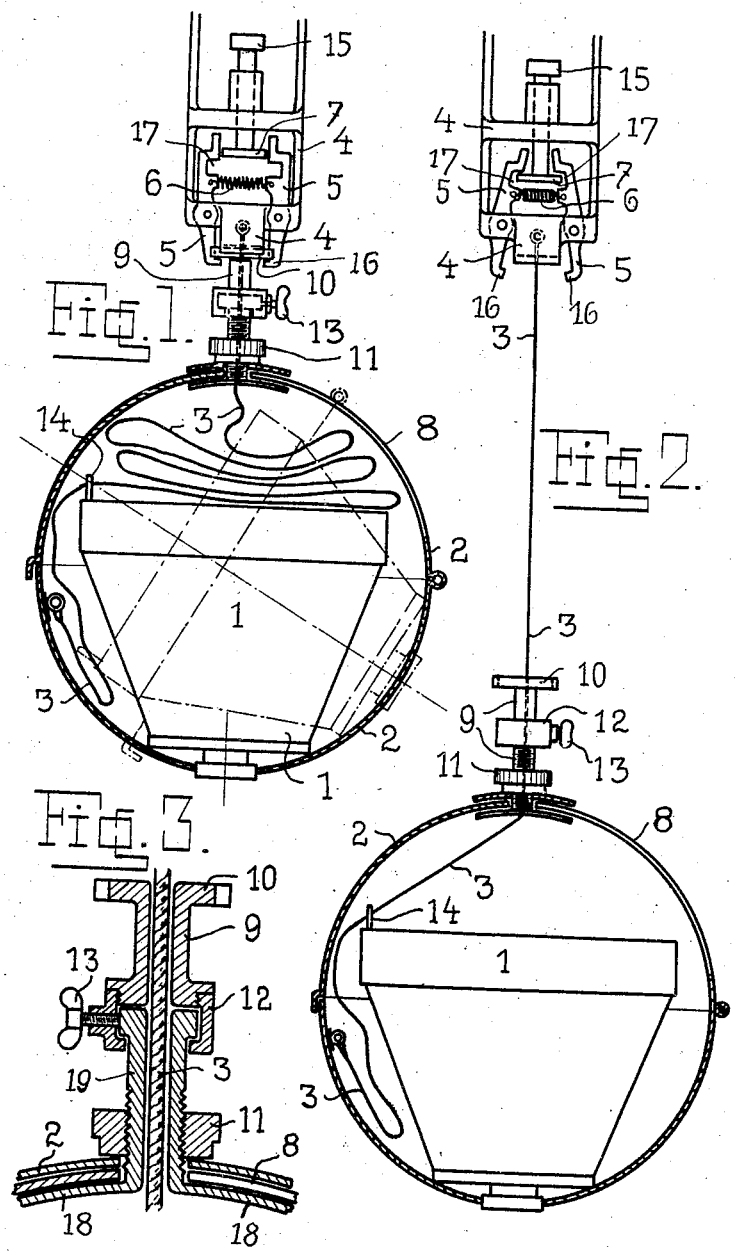

GEORG BRUNO SEELE, OF DRESDEN-STREHLEN, GERMANY.

APPARATUS FOR TAKING PHOTOGRAPHIC PICTURES FROM A HEIGHT.

No. 894,348.  Specification of Letters Patent.  Patented July 28, 1908.

Application filed August 29, 1907. Serial No. 390,641.

*To all whom it may concern:*

Be it known that I, GEORG BRUNO SEELE, a subject of the German Emperor, and residing at Dresden-Strehlen, Germany, have invented certain new and useful Improvements in Apparatus for Taking Photographic Pictures from a Height, of which the following is a specification.

The present invention has reference to improvements in apparatus for taking photographic pictures from a height downwardly, as for instance, from a balloon or kite, and the object of the invention is to prevent lateral deviations of the camera during the exposure, which are the chief causes of unsharp negatives. I obtain this result by detaching, so to say, the camera during the exposure from the carrier and allowing it to drop vertically a certain distance, during which drop the exposure takes place, after which the camera is arrested again in its descent. The swaying or other movements of the carrier, consequently, do not affect the camera during the free vertical drop, so that a sharp negative will result. Displacement of the camera has no disturbing effect on the exposure, if it takes place rapidly.

In order to make the invention more readily understood, I will now describe it with reference to the accompanying drawing, in which Figure 1 is a side view of the device for holding the camera in connection with the balloon, kite, long rod or other carrier, with the camera and its inclosing shell, the latter in section, prior to the disconnection of the camera; Fig. 2 is a similar view, during the drop of the camera; Fig. 3 shows a detail part in section.

The camera, 1, of any suitable construction is secured in the spherical shell, 2, and its lens projects through an opening in the wall thereof. The shell preferably is of metal and composed of two hinged halves with suitable locking mechanism.

The shell ordinarily hangs suspended from a gripper device which is suitably secured to the balloon or other carrier. This gripper device consists of the frame, 4, within which are pivotally journaled the double-armed levers, 5, having at their projecting ends jaws, 16, and at the opposite ends recesses, 17. A coil spring, 6, tends to spread the two facing jaws, unless the disk, 7, of a stemmed push bottom, 15, slidably arranged in the frame 4, is interposed between the inner ends of the double-armed levers, 5, above the recesses 17, as shown in Fig. 1.

The connection between the gripper and the camera part is effected by means of the two-piece connecting device 9, 19, the two halves of which are rotatively connected by the overlapping nut, 12, and provided with a thumb-screw, 13, for securing the two pieces in any desired relative position. The lower part, 19, is provided with extensions, 18, and with an outer screw thread upon which fits the clamping nut, 11. The camera supporting shell 2 is provided with a slot, 8, extending over approximately a quadrant and receiving the connecting member, 19. By means of this arrangement the shell may be adjusted in a vertical plane so as to set the camera at various angles within about 45°. By tightening the clamping nut, 11, the shell is secured in the adjusted position. After loosening the thumb-screw, 13, the part 19, with its suspended camera, may be rotated on its vertical axis, so that by continuing the two adjustments, the lens of the camera may be set to any desired focus angle within the useful sphere to be considered in this kind of work.

Ordinarily, the connecting member, 9, 19, is suspended from the gripper by the jaws, 16, of the levers, 5, engaging below a flange, 10, of the member, 9, as clearly shown in Fig. 1, the disk, 7, of the push bottom 15 counteracting the action of the draw spring, 6.

A rope, 3, is secured at one end to the gripper, 4, and at the other end to the camera receptacle or shell, 8, and is loosely folded within the shell. Some distance from where it is secured to the shell it is lightly held in a clamp or the like, 14, which in a suitable manner operates the release for the lens shutter. As these parts may be of any well known approved construction, and as they form no particular detail of my invention, I do not show and describe any one particular form of construction.

The operation is as follows: The angle and direction of the proposed exposure having been determined, the camera is set in position, the clamping nut, 11, and the thumb screw 13 are tightened, the camera shutter "set," and the carrier sent up. The release of the shell may be brought about in various ways; for instance, by means of a so-called "messenger" sent up on the rope holding a kite, by an electro-magnet or by a clockwork. Whatever releasing means may be used, its function in the construction shown is to force apart the jaws, 16, of the levers, 5, by pressing down the push bottom, 15, so that its disk drops into the recesses, 17, of the levers, 5, as shown in Fig. 2. The camera shell thus being released from the gripper, drops vertically downward, paying out the rope, 3, until the latter exerts a sudden pull on the shutter-releasing clamp, 14. The exposure is then effected, just prior to the rope having all been paid out.

What I claim as new is:

1. The combination with means for supporting a camera, of means for dropping the camera, and means for releasing the shutter while the camera is falling, substantially as described.

2. The combination with means for supporting a camera at a height, means for releasing and dropping the camera from its support, and automatic means for releasing the shutter of the camera during its fall, substantially as described.

3. The combination with a camera and means for supporting it at a height, of means for dropping the camera, means for releasing the shutter as the camera drops, and means for stopping the fall of the camera, substantially as described.

4. The combination with a camera and means for supporting it at a height, of means for dropping the camera, means for releasing the shutter as the camera drops, and automatic means for stopping the fall of the camera, substantially as described.

5. The combination with a camera and means for supporting it at a height, of automatic means for dropping the camera, means for releasing the shutter as the camera drops, and automatic means for stopping the fall of the camera, substantially as described.

6. The combination with a camera and means for dropping it from a height, of means for adjusting the focusing direction of the camera relative to the vertical line of fall, and automatic means for releasing the shutter as the camera falls, substantially as set forth.

7. The combination with a camera of a support therefor comprising a shell, clamping jaws for holding up the shell, means for spreading apart the jaws and dropping the camera, and means for releasing the shutter as the camera falls, substantially as described.

8. The combination with a camera, of an elevated support, means for dropping the camera therefrom, means for releasing the camera as the carrier falls, and means, as a folded string, for stopping the fall of the camera, substantially as described.

9. The combination with an elevated support, of a shell, a camera thereon and means for adjusting the shell on its horizontal and vertical axes, of a loose connection as a cord between the shell and the elevated support, means for releasing and allowing the shell and contained camera to drop, and means for automatically releasing the shutter of the camera as it drops, the cord stopping the fall after exposure, substantially as described.

In testimony whereof I affix my signature in presence of two witnesses.

GEORG BRUNO SEELE

Witnesses:
 PAUL ARRAS,
 CLÄRE SIMON.